United States Patent [19]
Jackson

[11] 3,735,269
[45] May 22, 1973

[54] DIGITAL FREQUENCY SYNTHESIZER

[75] Inventor: Leland B. Jackson, Monsey, N.Y.

[73] Assignee: Rockland Systems Corporation, West Nyack, N.Y.

[22] Filed: Oct. 29, 1971

[21] Appl. No.: 193,826

[52] U.S. Cl. .......................328/14, 328/37, 328/186
[51] Int. Cl. ...........................................H03b 19/00
[58] Field of Search..........................328/14, 186, 37

[56] References Cited

UNITED STATES PATENTS

| | | | |
|---|---|---|---|
| 2,958,828 | 11/1960 | Schreiber | 328/186 |
| 3,100,851 | 8/1963 | Ross et al. | 328/186 X |
| 3,184,685 | 5/1965 | Funk et al. | 328/186 X |
| 3,215,860 | 11/1965 | Neumann | 328/186 X |
| 3,500,213 | 3/1970 | Ameau | 328/14 |
| 3,657,657 | 4/1972 | Jefferson | 328/14 |

*Primary Examiner*—John S. Heyman
*Attorney*—Robert D. Flynn, Stephen H. Frishauf and Leonard Holtz

[57] ABSTRACT

A digital frequency synthesizer using modulo $10^N$ accumulator means for receiving signals corresponding to a predetermined frequency output and for successively generating signals corresponding to addresses in a storage means, each of the addresses corresponding to a storage location which stores digital values corresponding to at least the magnitude of a plurality of digital samples of the output signal from the synthesizer. A digital-to-analog converter converts the output of the storage means into a step-type waveform which is passed through a low pass filter to generate a smooth output waveform from the system. In order to reduce the size of the required storage device, sign and quadrature symmetry may be taken advantage of by making use of the redundancy of the magnitude of values in a sinusoidal signal generator.

40 Claims, 12 Drawing Figures

Patented May 22, 1973

3,735,269

6 Sheets-Sheet 1

Patented May 22, 1973

3,735,269

6 Sheets-Sheet 3

FREQUENCY SYNTHESIZER EXAMPLE

FREQ. = 1,500,500.500 Hz. ($500_{10}$ = $0111110100_2$ AT POINTS (A)) (1 AT POINT (B))

| CLOCK PULSE NO. | PHASE (CONTAINED IN ACC.S 2-4) | CARRY OUTPUTS AT (C) | SGN QUAD MSB | MOST-SIGNIFICANT MOD 1000 ACC. OUTPUT (POINTS (D)) $D_9$ - - - $D_0$ | MSB'(MSB ⊕ QUAD) | 999's COMP. OUTPUT AT (E) ($E_0 - E_9$) ROM ADDRESS $E_9$ - - - $E_0$ | ROM AND LOGIC OUTPUT ($0_1 - 0_{10}$) AT POINTS (F) $0_{10}$ - - - $0_1$ | $G_{11}$ | DAC INPUT AT POINTS (G) $G_{10}$ - - - $G_1$ |
|---|---|---|---|---|---|---|---|---|---|
| 1 | 0 | 0 | 0 0 0 | 0 0 0 0 0 1 1 0 0 0 (24) | 0 | 0 0 0 0 0 1 1 0 0 0 (24) | 0 0 0 0 0 0 0 0 0 1 | 0 | 0 0 0 0 0 0 0 0 0 1 |
| 2 | 1,500,500.500 | 1 | 0 0 1 | 1 0 0 0 0 0 1 1 0 0 (524) | 1 | 1 0 0 0 0 0 1 1 0 0 (524) | 1 1 1 0 1 1 0 0 0 0 | 0 | 1 1 1 0 1 1 0 0 0 0 |
| 3 | 3,001,001.000 | 0 | 0 1 1 | 0 0 0 0 0 1 1 0 0 1 (25) | 0 | 1 1 1 1 1 1 1 1 1 0 (1022) | 1 0 1 1 0 1 0 0 1 0 | 0 | 1 0 1 1 0 1 0 0 1 0 |
| 4 | 4,501,501.500 | 1 | 1 0 0 | 1 0 0 0 0 0 1 1 0 1 (525) | 0 | 1 0 0 0 0 0 1 1 0 1 (525) | 0 1 1 0 0 0 1 0 0 1 | 1 | 1 0 0 1 1 1 0 1 1 0 |
| 5 | 6,002,002.000 | 0 | 1 1 0 | 0 0 0 0 0 1 1 0 1 0 (26) | 1 | 1 1 1 1 1 1 1 1 0 1 (1021) | 1 1 1 1 1 1 1 1 1 0 | 1 | 0 0 0 0 0 0 0 0 0 1 |
| 6 | 7,502,502.500 | 1 | 1 1 1 | 1 0 0 0 0 0 1 1 1 0 (526) | 0 | 1 0 0 0 0 0 1 0 0 1 (521) | 0 1 1 0 0 0 0 1 1 0 | 1 | 1 0 0 1 1 1 1 0 0 1 |
| 7 | 1,003,003.000 | 0 | 0 0 1 | 0 0 0 0 0 1 1 0 1 1 (27) | 1 | 0 0 0 0 0 1 1 0 1 1 (27) | 1 0 1 1 0 1 0 1 0 1 | 0 | 1 0 1 1 0 1 0 1 0 1 |
| " | " | " | | " | " | " | " | " | " |
| " | " | " | | " | " | " | " | " | " |
| " | " | " | | " | " | " | " | " | " |

FIG. 4

DIGITAL FREQUENCY SYNTHESIZER

The present invention relates to frequency synthesizers and more particularly, to programmable digital frequency synthesizers using a direct digital synthesis technique.

Various types of digital frequency synthesizers are known in the art. For example, one known digital frequency synthesizer is described in *IEEE Transactions On Audio And Electroacoustics*, Volume AU–19, No. 1, March 1971, pages 48–56. Various difficulties and disadvantages are inherent in the above frequency synthesizer, such as complexity of design and construction, thereby increasing the cost and decreasing reliability of the resulting frequency synthesizer. Also, the above prior art synthesizer is not easily phase locked to a decimal base reference.

The main object of the present invention is to provide a digital frequency synthesizer which is easily programmable to provide desired frequency outputs, which is simpler in design and construction than known digital frequency synthesizers of this type, while providing high accuracy outputs, and which may be easily phase locked to a decimal base reference.

Another object of the present invention is to provide such a digital frequency synthesizer utilizing a memory which is reduced in size but which is effective to provide complete capabilities equivalent to systems having larger memories.

SUMMARY OF THE INVENTION

In accordance with the present invention, a digital frequency synthesizer includes an input device for setting in a predetermined output frequency and for generating digital signals representing the predetermined frequency output. A storage means, which has a plurality of storage locations for storing a plurality of digital values corresponding to at least the magnitude of a plurality of digital samples of the output signal from the synthesizer, is coupled to the output of modulo $10^N$ accumulator means which provides address signals as a function of the predetermined output frequency set into the input means. The address signals from the accumulator means correspond to respective storage addresses of respective storage locations in the storage means. The storage means provides output signals corresponding to digital values stored at storage locations represented by the address signals, the digital values corresponding to samples of the desired output signal from the synthesizer. The successively generated samples are fed to a digital-to-analog converter which generates a step-type representation of the output signal of the synthesizer as a function of the samples. The output of the digital-to-analog converter is coupled to a low pass filter which provides a smoothed output signal having the predetermined frequency set into the input means.

In accordance with a preferred embodiment, the output signal is a sinusoidal signal and the modulo $10^N$ accumulators are modulo 1000 accumulators.

BRIEF DESCRIPTION OF THE DRAWINGS

FIG. 4 is a chart showing digital signal levels at various points in the system of FIG. 1;

DETAILED DESCRIPTION OF PREFERRED EMBODIMENTS

Figure 1:
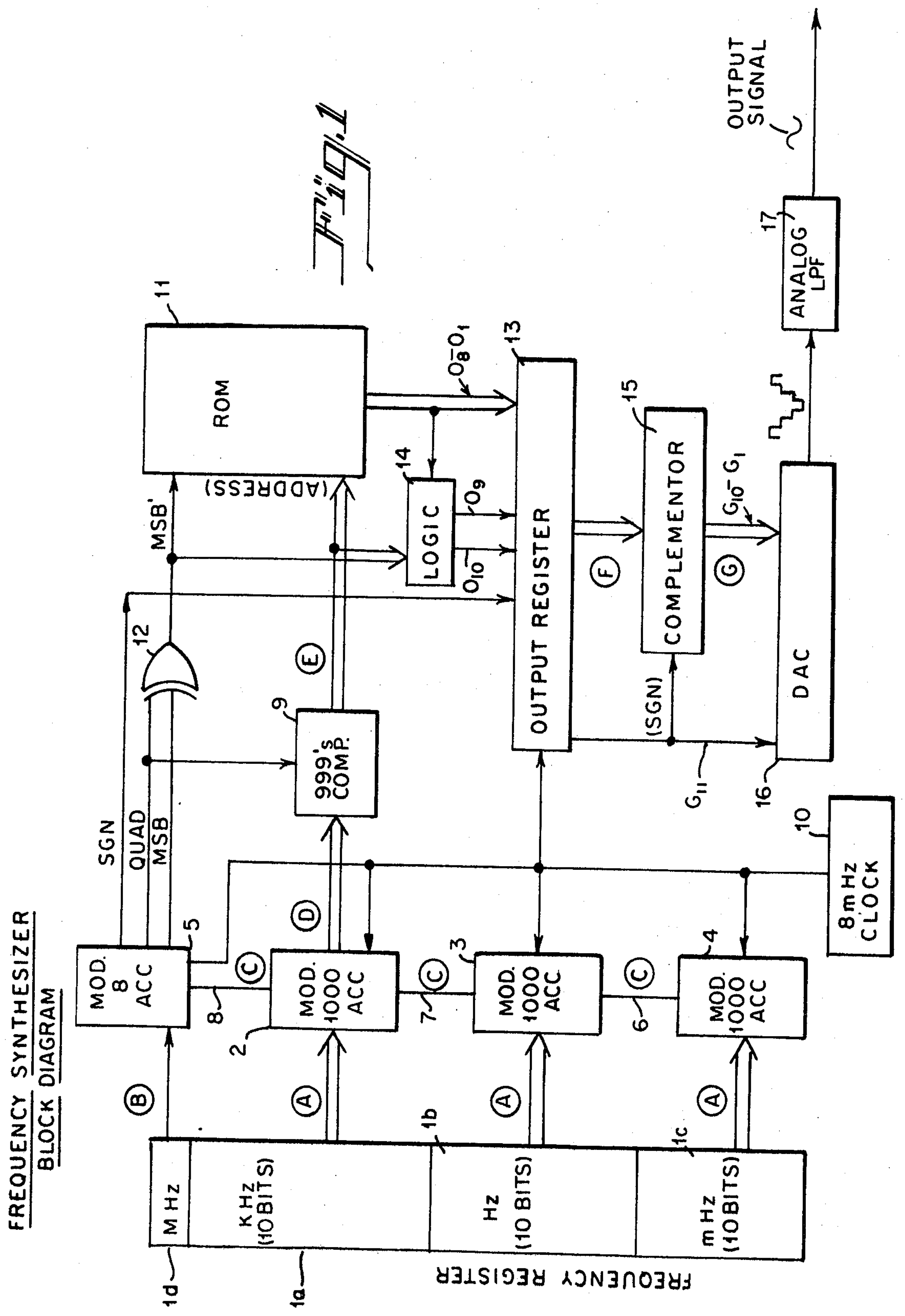
FIG. 1 is a basic schematic block diagram of a preferred embodiment of the present invention.
Figure 2:
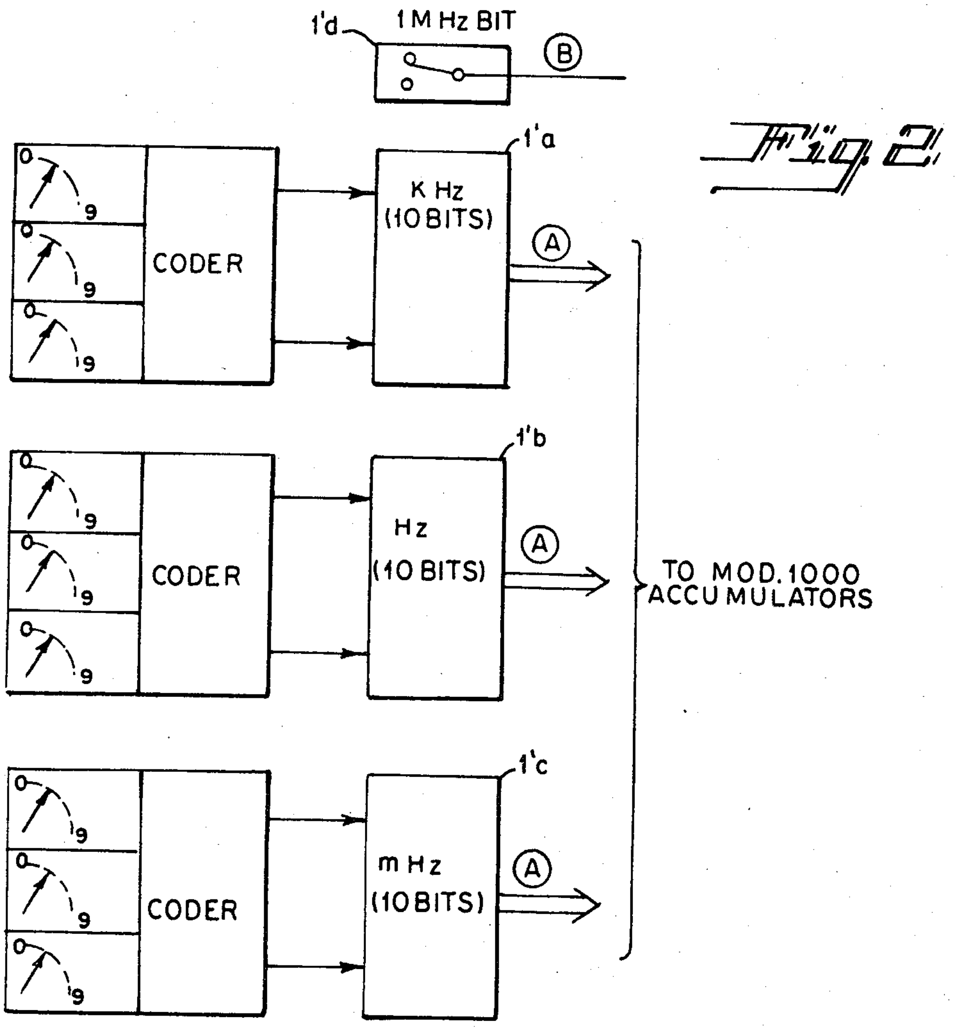
FIG. 2 shows another configuration of an input register of FIG. 1.

Referring to FIG. 1, there is shown a block diagram of a programmable frequency synthesizer according to the present invention. A frequency register 1, having in this example three sections 1*a*, 1*b* and 1*c* is utilized to set the desired output frequency of the synthesizer. It should be clear that the register sections 1*a*, 1*b* and 1*c* may comprise individual registers as indicated, for example, in FIG. 2 wherein blocks 1'*a*, 1'*b* and 1'*c* correspond to the register 1 of FIG. 1 also includes a section 1*d* for generation of a Megahertz (MHz) bit which corresponds to block 1'*d* in FIG. 2. As shown in FIG. 2, the MHz bit section 1*d* and 1'*d* contains, for example, merely a switch. The register sections 1*a*, 1*b* and 1*c* (and 1'*a*, 1'*b* and 1'*c*) are each 10 bit sections which enable selection of the frequency to 10 digital bit accuracy in each particular range. Switches coupled to coders as shown in FIG. 2 may be used to feed the input coded signals to register 1, for example.

The outputs of frequency register sections 1*a*, 1*b* and 1*c* are fed to modulo 1000 accumulators 2, 3 and 4, respectively. The output of section 1*d* of the frequency register is fed to a modulo 8 accumulator 5. The modulo 1000 accumulators 2–4 and modulo 8 accumulator 5 are serially coupled to each other via lines 6, 7 and 8 such that each accumulator feeds its overflow bits to the next subsequent accumulator. That is, accumulator 4 feeds its overflow to accumulator 3, accumulator 3 feeds its overflow to accumulator 2 and accumulator 2 feeds its overflow to accumulator 5. A clock generator 10 operating at for example 8 MHz, is fed to clock inputs of modulo 1000 accumulators 2, 3 and 4 and to modulo 8 accumulator 5.

The output of the modulo 1000 accumulator 2 is fed to a 999's complementor 9. The "quadrant" output (QUAD) of the modulo 8 accumulator 5 is also fed to the 999's complementor 9, to indicate a particular quadrant of the sinusoidal output of the synthesizer.

Figures 3, 5:
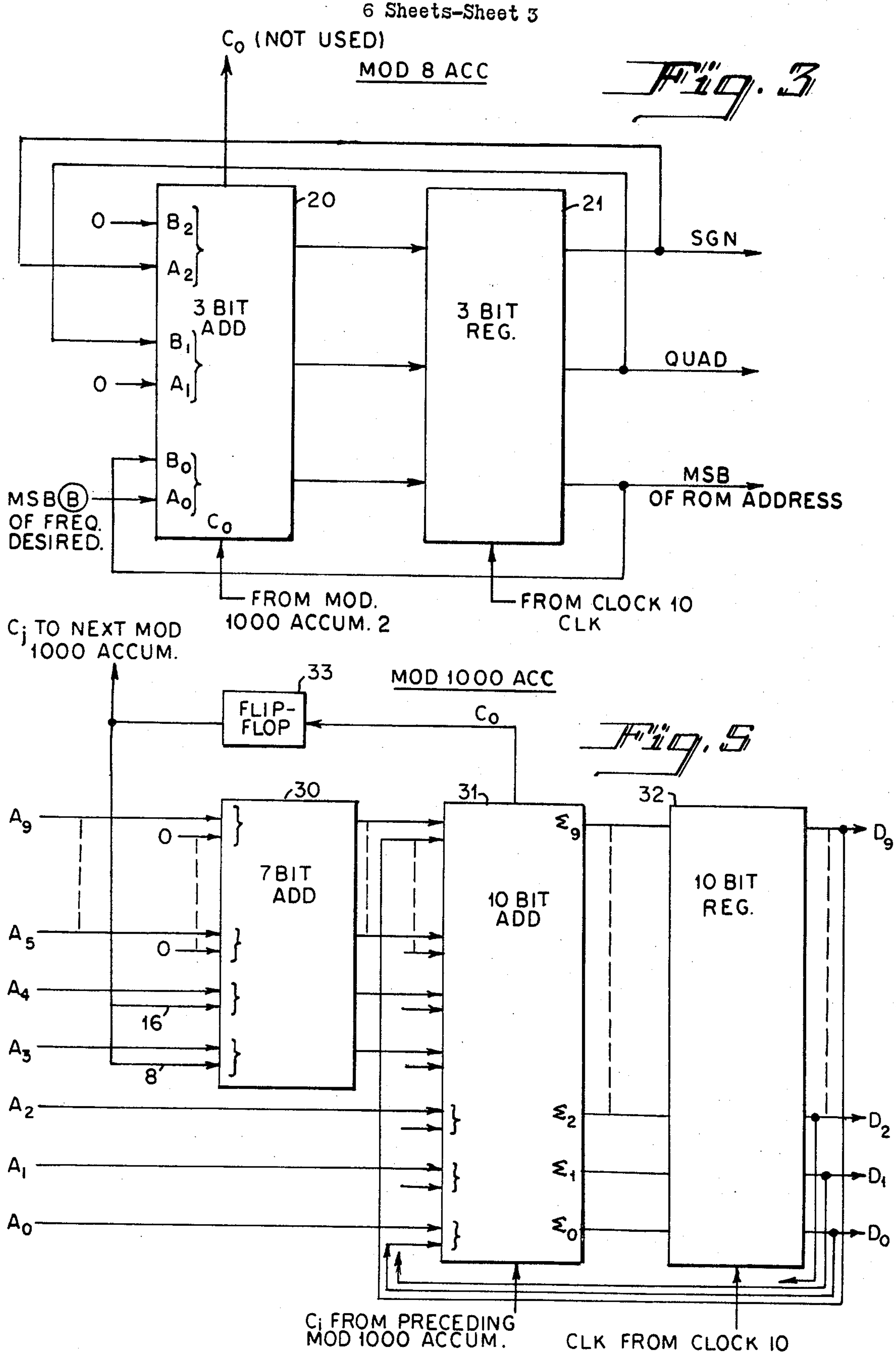
FIG. 3 is a schematic block diagram of the modulo 8 accumulator of FIG. 1.
FIG. 5 is a schematic block diagram of the modulo 1000 accumulator of FIG. 1.

The modulo 8 accumulator 5 also provides a sign output "SGN" and a most significant bit output "MSB". FIG. 3, which is discussed below, illustrates a detailed block diagram of the modulo 8 accumulator 5 for use in the present invention. How the signals SGN, QUAD and MSB are generated is discussed below with reference to FIG. 3.

The output of the 999's complementor 9 is fed to a Read Only Memory (hereinafter referred to as ROM) 11, the MSB output of modulo 8 accumulator 5 also being fed to ROM 11 via an exclusive OR gate 12. The MSB signal from accumulator 5 designates the most significant bit of the ROM address signals fed to the ROM from the 999's complementor 9 and accumulator 5. The address signals thus fed to ROM 11 correspond to a particular storage location in ROM 11 which then generates an output signal corresponding to stored bits 1 through 8 of a digital representation of the desired output frequency. The first through eighth bits of the 10-bit digital representation of the particular digital sample are fed from ROM 11 to an output register 13 and bit 8 is also fed to a logic circuit 14. A signal MSB′, derived from the MSB bit by gate 12 and signals corresponding to the three most significant bits of the output from the 999's complementor are fed to logic circuit 14 which determines from these signals the two most significant bits (i.e., bits 9 and 10) of the signals representing a sample of the desired system output signal of the synthesizer.

The output of the logic circuit 14 feeds the digital representation of the first two most significant bits of the signals representing a sample of the desired system output signal to output register 13. Output register 13 also receives the SGN output from accumulator 5 and the clock signal from clock 10. The output of the output register 13 is fed to a complementor 15, as is the SGN bit from the output register. The SGN bit and the outputs from complementor 15 are fed to the digital-to-analog converter 16 (hereinafter referred to as DAC) which includes a 2's complementor as a part thereof. A typical DAC is the Varadyne Systems Inc., DAC–HI 10 B. The output of the DAC 16 is a step-type representation of the desired output frequency which is then fed to an analog low pass filter 17 to provide a sinusoidal waveform signal corresponding to the desired frequency set at the frequency register 1. Filter 17 is a conventional passive filter, although it is clear that active filters or other types may be used.

When the ROM 11 stores truncated sample values the complementor 15 is a 1's complementor, and when the ROM stores rounded-off sample values the complementor 15 is a 2's complementor. This concept is discussed in more detail hereinbelow.

In order to clarify the operation of the present invention and to facilitate understanding of the concepts involved, FIG. 4 is a chart showing the various digital signal levels appearing at various points indicated in the system shown in block diagram form in FIG. 1. FIG. 4 will be discussed hereinbelow.

Referring again to FIG. 3, the modulo 8 accumulator includes a 3-bit adder 20 wherein the $A_o$ input is the input signal corresponding to the MSB of the frequency of the desired output signal of the system. The $C_o$ input of adder 20 is the overflow (or carry bit) from accumulator 2 of FIG. 1. The $A_1$ and $B_2$ inputs of adder 20 are fixed at the "0" input level.

The three outputs of adder 20 are fed to a 3-bit register 21, which for example, is comprised of three flip-flop elements. The SGN output of register 21 is fed-back to the $A_2$ input of adder 20, the QUAD output is fed back to the $B_1$ input of adder 20 and the MSB output is fed back to the $B_o$ input of adder 20.

The register 21 also receives the clock signal from clock 10 to gate the inputs in the appropriate timed relationship with the remainder of the system.

The SGN signal indicates the polarity of the sinusoidal system output signal with respect to a given reference level at a given point in time and the QUAD signal indicates the quadrant of the sinusoidal system output signal at that same point in time.

Referring to FIG. 5, there is shown a schematic block diagram of a modulo 1000 accumulator which is preferably used to implement the accumulators 2, 3 and 4 of FIG. 1. Since 10 bit binary digital codes use as a base 1024, and it is desired in this embodiment to operate modulo 1000, it is necessary to provide an accumulator which effectively eliminates the first 24 counts to provide effective accumulation with a base of 1000. This is accomplished in the embodiment of FIG. 5 by utilizing a 7-bit adder 30 to which is supplied input signals $A_3 - A_9$. These are the seven most significant bits of the 10 bit frequency register signals which comprise the outputs of frequency register sections 1$a$, 1$b$ and 1$c$, respectively, of FIG. 1. In order to increment by 24 to get modulo 1000 accumulation, selective inputs of the adder 30 are fixed at the 1 and 0 level. The second adder inputs at the respective adder stages corresponding to the $A_3$ and $A_4$ bits are set at 1 (to signify the number 8 and 16, respectively) when the overflow signal $C_j$ is present and the remaining inputs of the adder corresponding to inputs $A_5 - A_9$ are set to 0 to effectively provide no incrementation for these inputs. The incrementation by means of the fixed inputs to the adder 30 occurs every time the accumulator overflows as will be explained hereinbelow. Every bit input $A_k$ (where $k=0$ to 9) to the modulo 1000 accumulator has a weight of $2^k$.

In the 10 bit configuration of FIG. 5, bits $A_o - A_2$ are fed directly to the three least significant inputs, respectively, of a 10-bit adder 31 and the outputs of the 7-bit adder 30 corresponding to bits $A_3 - A_9$ of the input to the modulo 1000 accumulator are fed to the seven most significant inputs, respectively, of the 10-bit adder 31. The signals bracketed together in the adders 30 and 31 of FIG. 5 are added together by the respective adder stages.

The sum signals $\Sigma_o - \Sigma_9$ are respectively fed to inputs of a 10-bit register 32. The respective outputs of 10 bit register 32 are fed back to corresponding inputs of the 10-bit adder 31. That is, the output of register 32 corresponding to bit $A_9$ is fed-back to the ninth position of adder 31 to be summed with the output of 7-bit adder 30 corresponding to the $A_9$ bit. Likewise, the output of register 32 corresponding to the $A_o$ bit is fed-back to the zero position of the 10-bit adder 31 to be summed with the $A_o$ bit fed to the modulo accumulator. The 10-bit adder 31 receives a $C_i$ (overflow or carry) signal from the preceding modulo 1000 accumulator. The 10-bit register 32 also receives a clock signal from clock 10 to synchronize the operation thereof. The $C_o$ signal from 10-bit adder 31 is the "overflow" signal and is generated each time the system is cycled and is fed to a flip-flop circuit 33. The output of flip-flop circuit 33 provides the $C_j$ (overflow) signal to the next modulo 1000 accumulator and is also used to generate the fixed "1" signals fed to the first two input positions of 7-bit adder 30 to increment the accumulation by 24 to obtain modulo 1000 accumulation. The individual elements comprising the accumulator showin FIG. 5 are well known in the art and a more detailed discussion thereof is omitted for the sake of clarity. A modulo 1000 accumulator may comprise, for example a plurality of National Semiconductor DM 8283N 4-bit adders interconnected to provide the 7 bit and 10 bit adders 30 and 31. The register 32 may be comprised of flip-flops, as is well known.

The output signals from the 10-bit register 32 are not externally utilized for the modulo 1000 accumulators 3 and 4. However, for the accumulator 2, the output signals from the 10-bit register 32 are utilized and are fed to the 999's complementor 9 of FIG. 1.

Figure 6:
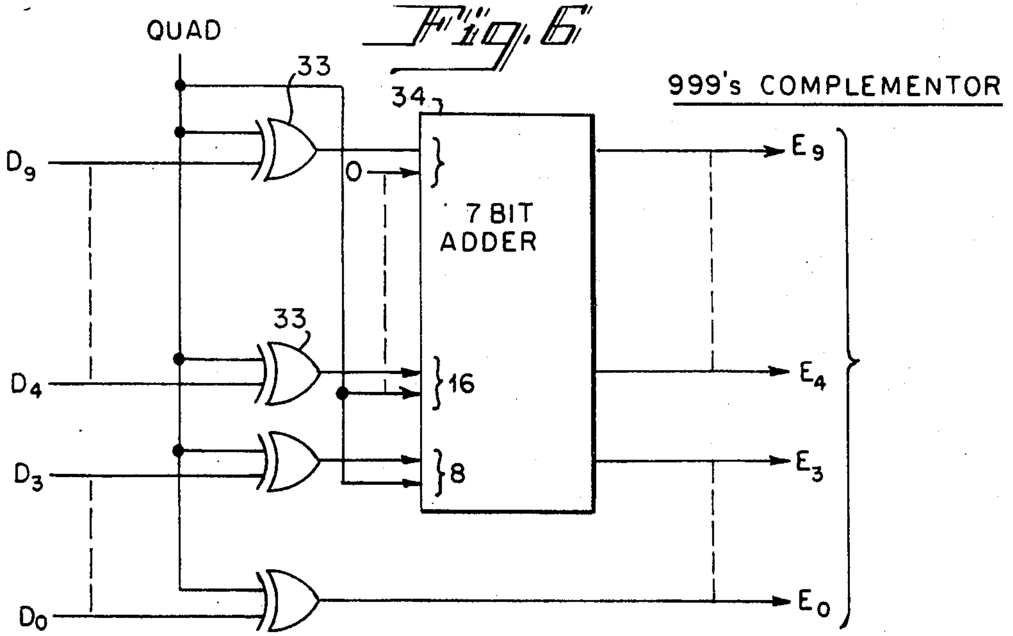
FIG. 6 is a schematic block diagram of the 999's complementor.

The 999's complementor 9 of FIG. 1 effectively complements numbers from 24–1023. For example, a 1023 input which is 999 complemented results in a 24 output. Alternatively, a 24 input which is 999 complemented results in a 1023 output. This is effected in accordance with the present invention by first inverting all of the inputs to the 999's complementor and then adding the fixed number 24 to the result. This effectively results in the 999's complement of the output of the modulo 1000 accumulator 2. FIG. 6 illustrates a typical embodiment of a 999's complementor according to the present invention. The output signals from the modulo 1000 accumulator 2 are fed to respective exclusive OR gates 33 along with QUAD signals. The QUAD signals are also provided to the "8" and "16" input stages of a 7-bit adder 34 which effectuates the incrementation by 24 in order to provide the necessary addition to arrive at the proper 999's complement of the input signal. The exclusive OR gates 33 effect the selective inversion of bits prior to the addition of 24. The output signals E of the 999's complementor represent the ROM address of a particular location in the ROM 11.

The 999's complementor also may be comprised of the same adders as used in the mod 1000 accumulators and the gates 33 may be Fairchild 9014 exclusive OR's.

With a 10 bit output $E_o - E_9$ from 999's complementor 9, and with the MSB' signal, an 11 bit effective address for the ROM is generated which enables efficient use of a 2048 bit ROM 11. In a preferred embodiment it has been found that storing of 500 digital samples (in a 512 word memory – 12 word location not used) per quadrant of the output sinusoidal signal from the synthesizer provides sufficient accuracy. In the event that a 512 word memory is used, only 9 address bits are required to give access to all word locations. This may be achieved by merely dropping the two least significant bits either from the input or output of 999's complementor 9.

This concept enables improving the system accuracy by merely replacing the ROM with one of greater storage capacity. This effectively provides more samples per quadrant. Accuracy can also be charged by changing the number of bits stored in the ROM at each word storage location. This charges the accuracy of each individual sample and likewise improved overall system accuracy.

By virtue of the nature of exclusive OR gates 33, the QUAD signal controls selective inversion of the input signals $D_o - D_9$. Also QUAD controls inversion of MSB via exclusive OR gate 12. For example, in the first quadrant of the output sinusoid signal, QUAD = 0 and the inputs to the 999's complementor and MSB are not inverted and the 999's complementor does not increment by 24. In this case, the outputs $E_o - E_9$ are the same as the inputs $D_o - D_9$. In the second quadrant of the output sinusoid, since the output signal exhibits quadrature symmetry, by taking the 999's complement of the $D_o - D_9$ signals, and by inverting MSB to MSB', one arrives at an ROM address of a "first quadrant value" which corresponds in magnitude to the desired "second quadrant value". Thus, when QUAD = 1, the $D_o - D_9$ inputs are inverted by gates 33 and are incremented by 24 by adder 34 and the $E_o - E_9$ outputs which represents an ROM address with MSB', are the 999's complement of the $D_o - D_9$ inputs. Similar events take place for the third and fourth quadrants. By this expedient, the required size or storage capacity of the ROM is reduced by half over that required to store sample values for systems using only polarity symmetry of a sinusoid. This technique eliminates the necessity of storing duplicate sample values which are the same in magnitude and which differ only in sign and in their relative position in the output signal. The circuitry subsequent to the ROM uses the SGN signal to give the correct polarity to the derived sample values from the ROM.

FIG. 4 clearly shows the function of the QUAD signal in relation to the 999's complementor. When QUAD = 0, the 999's complementor does not complement and when QUAD = 1 the input to 999's complementor 9 are appropriately complemented. As shown in FIG. 4, the SGN signal is effective to indicate polarity at a given time and operates the 1's complementor 15 accordingly. This effectively utilizes polarity symmetry to reduce the ROM size.

The ROM 11 is a standard type item which is sold in integrated circuit form by various manufacturers. A typical ROM for use in the present invention is Signetics Memory Systems ROM No. 8205 – 4096 Bit 512×8 memory. Others of different capacity or configuration could also be used. As discussed above, an object of the present invention is to reduce the amount of circuitry required while maintaining the necessary accuracy in a frequency synthesizer. One of the key elements in the frequency synthesizer is the ROM, and it is desired to keep the size of the ROM to a minimum. The larger the ROM, the more expensive will be the system.

In a typical example, in order to further maintain the size of the ROM to a minimum, the various storage locations of the ROM hold 8 bits. If the desired accuracy of the output of the system is to "10 bits", it has been found that this accuracy can be obtained by storing in the ROM only the eight least significant bits of a particular digital step or sample of the output signal and to develop the two most significant bits from the four most significant bits of the address for the ROM and from the most significant bit of the ROM output. This effectively extends the accuracy of the system with a given ROM storage capacity and will be discussed in more detail hereinbelow.

In a preferred embodiment, truncated sine sample values are stored in the ROM. This is contrary to the generally practices procedure of "rounding off" which is generally done in the prior art as exemplified, for example, by the synthesizer described in IEEE Transactions On Audio And Electroacoustics, identified hereinabove. By truncating digital representation of the sine sample values prior to storage in the ROM, that is, dropping all least significant bits beyond the number of bits required for a predetermined system accuracy, as is done in the present invention, it is possible to use 1's complementing to get the third and fourth quadrants of the output sine signal sample values with the same accuracy that the prior art gets by using a more complicated 2's complementing scheme combined with rounding off. To 1's complement, it is only necessary to invert the input signals, thus resulting in a less expensive and less complicated system while still getting the same accuracy.

Figures 7A, 7B:
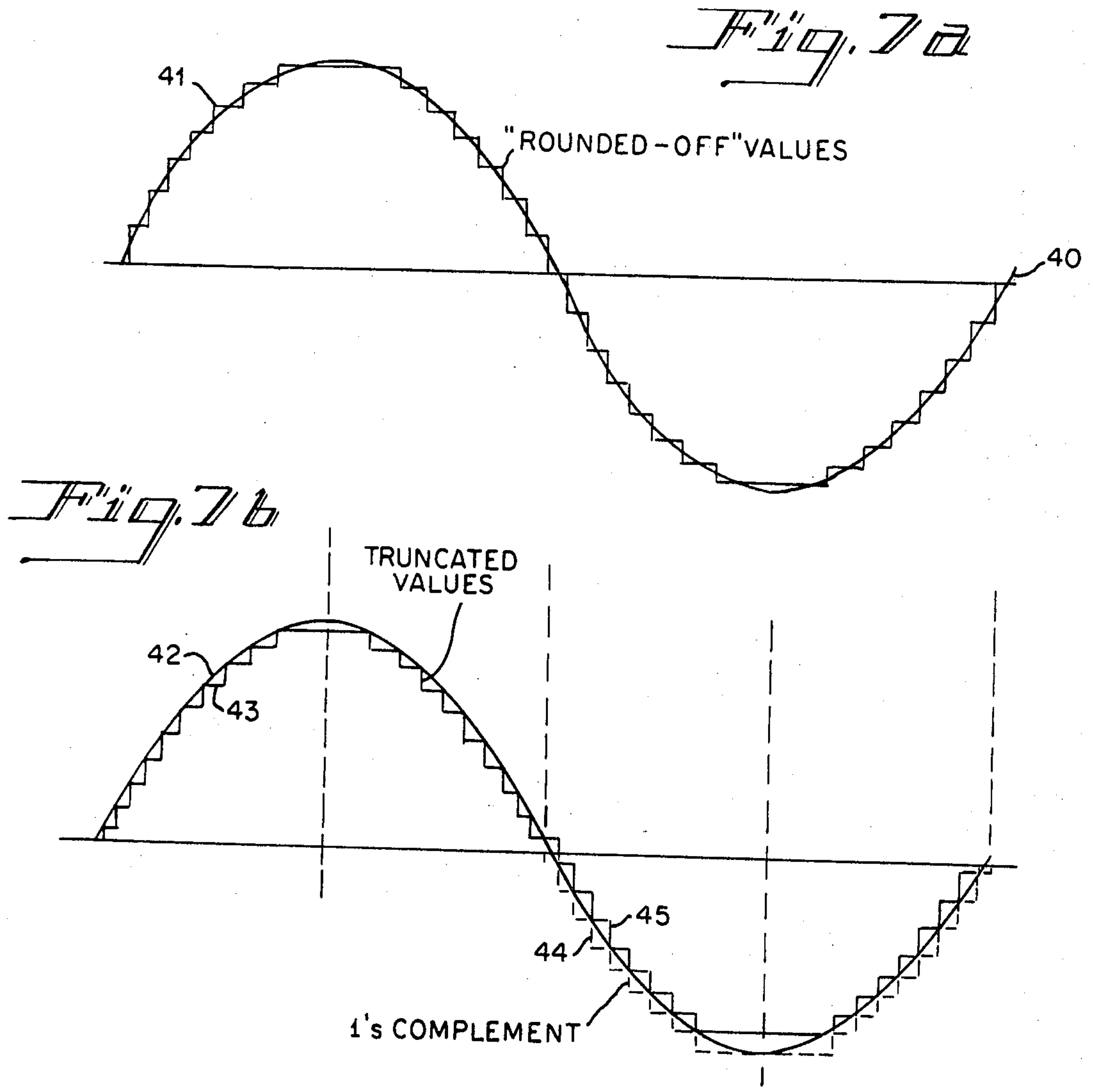
FIGS. 7a–7d are diagrams of waveforms obtained with the present invention and corresponding waveforms of prior art devices.

FIGS. 7*a* and 7*b* illustrate the above concept. For example, FIG. 7*a* shows the desired output signal 40 and the step type signal that results when "rounding off" the digital values of the samples which are to be used in generating the frequency signal 40. FIGS. 7*a* and 7*b* are shown in a exagerated scale for ease of explanation.

In FIG. 7*b*, the desired output signal is shown as 42 and the truncated stored sample values are shown as a step waveform 43 in the first quadrant. Quadrant 2 is obtained by 999's complementing and step waveform 45 in the negative quadrants is obtained by 2' complementing the appropriate values, which is done in the prior art. In the present invention, in the negative quadrants of the desired output signal, the stored truncated values are 1's complemented to arrive at the truncated values illustrated by the dashed line 44. As a result of feeding the signals 43 in the positive quadrants and the signals 44 in the negative quadrants through an analog low pass filter, such as filter 17 of FIG. 1, the desired sinusoidal output signal is obtained. A slight d.c. shift is introduced in the process, but this is inconsequential and can be easily eliminated.

Figure 7C:
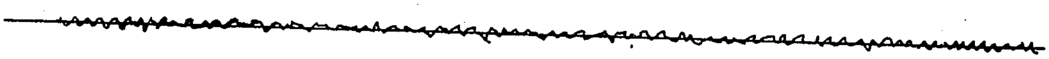
Figure 7D:
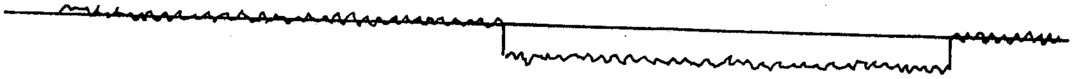

FIG. 7*c* illustrates the error when taking the 2's complement of rounded off sample values or when taking the 1's complement of truncated values. The error in both cases is identical. FIG. 7*d* illustrates the error if taking the 1's complement of rounding off or the 2's complement of truncation. It is seen that in this case the error is greater than in the situation illustrated in FIG. 7*c*. In the present invention, the lower error, which averages to zero, as illustrated in FIG. 7*c* is obtained. Thus, truncation combined with 1's complementing is an advantageous arrangement in a synthesizer of the present type.

Thus, in accordance with the present invention, when the SGN signal which is provided by the modulo 8 accumulator 5 indicates that the signal is in the "negative portion" relative to a reference level (which corresponds to the third and fourth quadrants), the 1's complementor 15 is activated to 1's complement the input signals thereto to provide the appropriate truncated values as indicated in FIG. 7*b*. The resulting output signal from the 1's complementor 15 is fed to DAC 16 wherein the step signal is generated. The one's complement 15 may comprise exclusive OR gates similarly to the 999's complementor gates 33.

Figure 8:
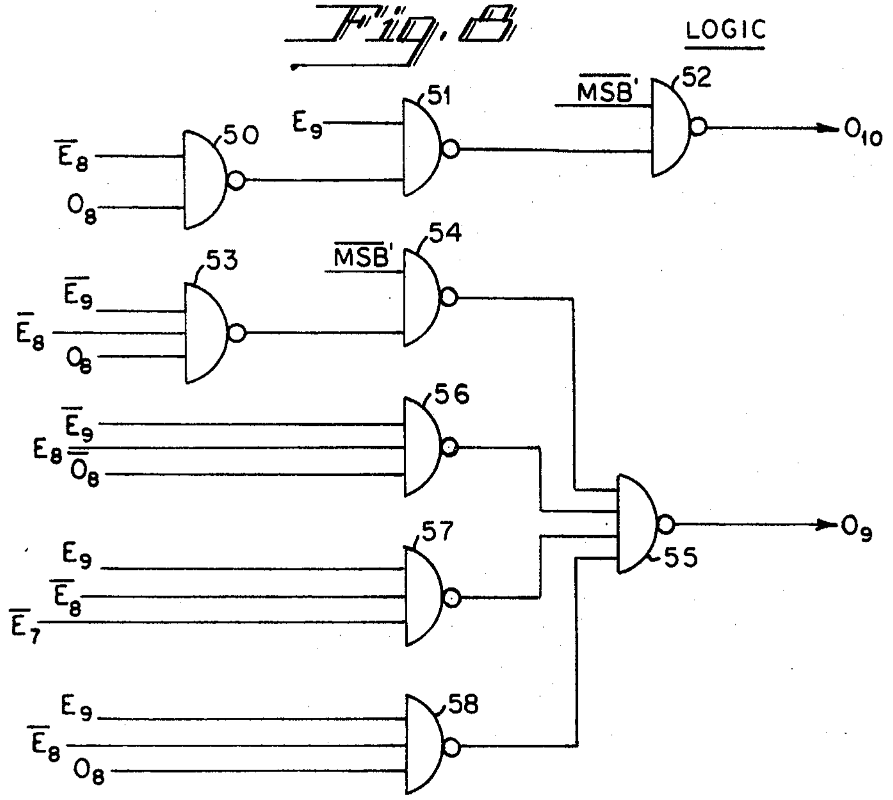
FIG. 8 is a schematic block diagram of the logic circuit of FIG. 1.

Referring to FIG. 8, there is shown a detailed schematic diagram of the logic circuit 14 of the present invention which is utilized to develop the two most significant bits of the 10 bit signal corresponding to a given digital sample of the desired output signal. The logic circuit 14 receives the MSB' input (which corresponds to the most significant address but for the ROM 11) and also receives the $E_9 - E_7$ signals from the 999's complementor 9. Logic circuit 14 also receives the $O_8$ output bit (the most significant output bit from ROM 11).

In the logic circuit of FIG. 8 all of the illustrated gates are NAND gates and are hereinafter referred to merely as "gates". Gate 50 receives the $O_8$ bit from the ROM which corresponds to the most significant bit of the stored sample from the ROM. Gate 50 also receives the inverted $E_8$ output from the 999's complementor. The output of the gate 50 is fed to one input of gate 51 and the $E_9$ output from the 999's complementor is fed to the other input thereof. The output of gate 51 is fed to one input of gate 52 and the MSB' output of exclusive OR gate 12 (which corresponds to the selectively inverted MSB bit from modulo 8 accumulator 5) is fed to the other input of gate 52. The output of gate 52 is the $O_{10}$ bit which corresponds to the most significant bit of a given sample magnitude of the output waveform.

Further referring to FIG. 8, the inverted $E_9$ and $E_8$ outputs of the 999's complementor 9 are fed to respective inputs of gate 53 and the $O_8$ output (the MSB from the ROM output) is fed to the third input of gate 53. The output of gate 53 and the MSB' signal are fed to respective inputs of gate 54, the output of which is fed to one input of gate 55. Likewise, various signals are fed to the respective inputs of gates 56, 57 and 58, as shown in FIG. 8, and the outputs of gates 56–58 are fed to respective inputs of gate 55. The output of gate 55 is the $O_9$ bit which is the second most significant bit of the output signal corresponding to the magnitude of a sample of the desired sinusoidal output signal. The $O_1 - O_{10}$ bits are fed to the output register 13, the output of which is fed to the complementor 15. In this manner, by using an only 8 bit capacity storage for each location of the ROM, it is possible to develop at 10-bit accuracy signal using the simple logic circuit 14.

The logic circuit 14 is based on the concept that in a quadrant of the sinusoidal output signal, the digital representation of samples exhibits a predicable predetermined pattern. For example, in the first quadrant, from 0°–15° the ninth bit of the digital representation of a sample is "0", at which point it becomes "1". Also, from 15°–30° the ninth bit remains "1" and at 30°, changes to "0". These transitions occur periodically at fixed angular spacings along a sinusoidal signal. Similarly, from 0°–30° the most significant bit (i.e., the tenth bit) of the digital representation of a sample is "0". At 30°, the tenth bit goes to "1" and remains "1" until the end of the first quadrant, and also into the second quadrant. Thus, by effectively detecting subquadrants by detecting various address and output information from the ROM, the logic 14 derives the two most significant bits of the sample. The $O_8$ bit fed to logic 14 gives the transition point between subquadrants for determination of the ninth bit of the sample representation. The address signals MSB' and $E_7 - E_9$ tell which quadrant one is in a given time to derive the most significant bit of the sample representation. Thus, the $O_8$ bit contributes "fine" information and the address signals fed to logic 14 contribute "coarse" information. The logic circuit 14 is shown only by way of example. Other configurations may be used, depending upon the particular signal and system configuration.

Figure 9:
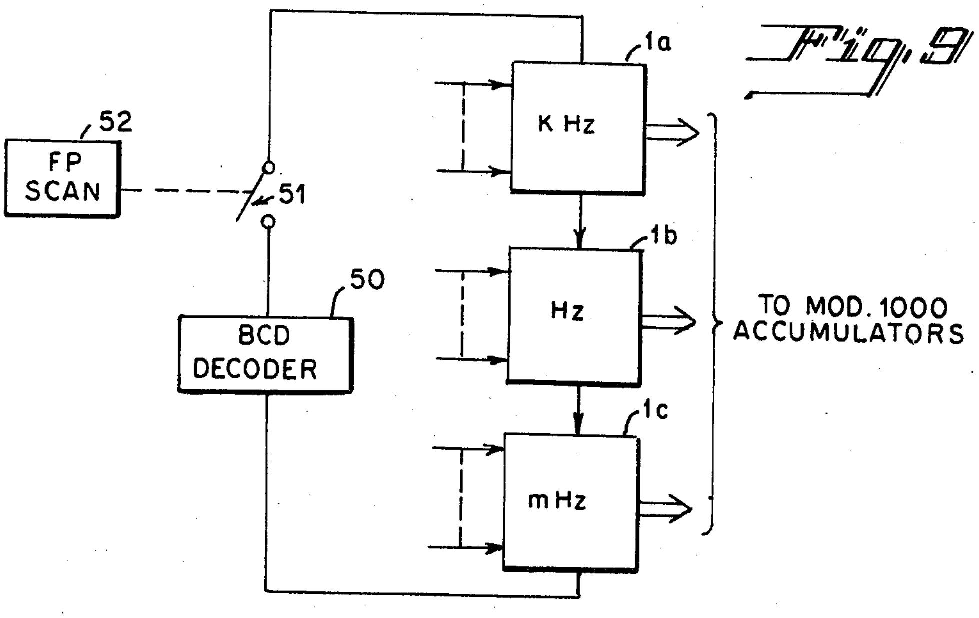
FIG. 9 is a schematic block diagram of the BCD input means of the present invention.

In various instances, it may be desired to set the desired output signal of the system using a BDC code. In this instance, the frequency register 1 is set up as indicated in FIG. 9. In this embodiment, the register sections 1*a*, 1*b* and 1*c* are serially connected to each other and a BCD decoder 50 is selectively coupled thereto to circulate the digital information when a switch 51 is closed. When switch 51 is open, the input signals are fed to the register 1 in the normal manner using ordinary binary digital coding. When the binary coded decimal information is fed in, the FP scan 52 is actuated which closed switch 51 which in turn causes the BCD information inserted into the frequency register 1 to be circulated around the register for conversion into standard binary configuration. The BCD decoder 50 is preferably incorporated into the sytem of FIG. 1 to enable the apparatus to accept input coding in BCD or standard binary format.

In summary, the present invention provides a unique digital frequency synthesizer which utilizes modulo 1000 accumulation (or any decimal base) which gives the ability to phase lock to a decimal base reference. It should be clear, however, that any other modulo $10^N$ base could be used as desired. In this event, the various accumulators will then be modified to operate in accordance with the desired base. Modulo 1000 accumulation which enables phase locking with a decimal base and which provides efficient use of a 10-bit arithmetic logic is extremely advantageous.

Accumulation modulo $10^n$, rather than $2^k$ as is done in most prior art apparatus, allows the clock signal to be locked to an external reference at, for example 1 MHz. This enables a more standard clock frequency to be used (such as 8 MHz instead of about 8.5899 MHz), and is advantageous in practice from the point of view of equipment availability, interchangeability, design and cost.

The use of quadrature symmetry in the present invention enables the ROM size to be cut in half by merely 999's complementing of the address, depending upon the particular quadrant for which the sample signals are being generated. As seen from FIG. 6, the 999's complementor is operative only when the QUAD signal is 1, which, in the present invention, indicates that signals are being developed for the second and fourth quadrant. Since a sinusoidal signal is symmetrical in both the negative and positive portions thereof, and since the sinusoidal signal exhibits quadrature symmetry, it is possible to utilize SGN signal, and 999's complementor in conjunction with a QUAD signal, to provide the same accuracy as is obtainable with a ROM which is four times the size of that of the present invention. Of course, if in a particular application the ROM can be economically expanded, 999's complementor can be eliminated in favor of a larger memory. In this case addresses will be gotten from accumulator 4.

Also, as discussed above, truncation of values prior to storage in the ROM rather than "rounding off" may be used. This enables 1's complementing of the ROM output instead of 2's complementing of rounded off values which is done in the prior art. The results are equivalent, but the 1's complementing arrangement of the present invention is simpler and more economical from a circuitry point of view. It should be clear that rounded off values could be stored in the ROM, and in this event, complementor 15 becomes a 2's complementor. This is a more complex arrangement, since a 2's complementor is effectively a 1's complementor in combination with an adder of the appropriate length. By using truncated sample values, the additional adder is eliminated.

Logic circuit 14 enables substantial reduction of ROM size by utilizing the predicable nature of the output signals, so that bits which really do not give information which cannot effectively be obtained from other signals, need not be stored.

By increasing the clock frequency, and by increasing the size of accumulator 5, the upper frequency limit of the system can be increased. For example, with a 16 MHz clock, with accumulator 5 being modulo 16, and with two bits being used in place of the single MSB bit, the upper frequency limit can be raised from approximately 2 MHz (1.9999 MHz) to about 4 MHz (3.999 MHz). In this event the ROM size would also have to be doubled to expand the frequency range while still maintaining the basic decimal relationship to the smallest frequency step.

The accumulator can be reduced to modulo 4 and the MSB bit eliminated if it is desired to reduce the upper frequency limit to about 1 MHz (0.999 MHz). Then the output of accumulator 4 will provide all of the address signals for the ROM 11. Using the above concepts, it should be clear how to raise or lower the frequency range of the present frequency synthesizer.

I claim:

1. A digital frequency synthesizer comprising:

input means for setting a predetermined output frequency and for generating digital signals representing said predetermined output frequency;

storage means having a plurality of storage locations for storing a plurality of digital values corresponding to at least the magnitude of a plurality of digital samples of the output signal from said synthesizer;

modulo $10^N$ accumulator means receiving output signals from said input means for generating successive signals corresponding to respective storage addresses of respective storage locations in said storage means;

a fixed frequency standard coupled to said accumulator means for causing said accumulator means to generate said successive signals;

said storage means being responsive at least to the output of said modulo $10^N$ accumulator means for generating output signals corresponding to the digital values stored at the storage locations represented by the address signals coupled thereto from said modulo $10^N$ accumulator means;

a digital-to-analog converter coupled to the output of said storage means for generating a step-type representation of the output signal from said synthesizer as a function of said samples represented by the output of said storage means; and a low pass filter coupled to the output of said digital-to-analog converter and responsive to said step-type representation for generating a smoothed output signal having said predetermined frequency.

2. The frequency synthesizer of claim 1 wherein said output signal from said synthesizer is a sinusoidal waveform.

3. The frequency synthesizer according to claim 1 wherein said low pass filter is a passive analog low pass filter.

4. The frequency synthesizer according to claim 1 wherein said modulo $10^N$ accumulator means includes at least one modulo 1000 accumulator.

5. The frequency synthesizer according to claim 1 wherein said modulo $10^N$ accumulator means includes a plurality of cascaded modulo $10^N$ accumulators, the overflow signal of one accumulator being coupled to an input of the next successive accumulator, each accumulator receiving selective signals from said input means corresponding to predetermined digits of the predetermined output frequency.

6. The frequency synthesizer according to claim 5 wherein each of said cascaded modulo $10^N$ accumulators are modulo 1000 accumulators.

7. The frequency synthesizer according to claim 5 wherein the accumulator corresponding to the more significant of said digits has its outputs coupled to said storage means to provide said address signals.

8. A digital frequency synthesizer comprising:
input means for setting a predetermined output frequency and for generating digital signals representing said predetermined output frequency;
storage means having a plurality of storage locations for storing a plurality of digital values corresponding to at least the magnitude of a plurality of digital samples of the output signal from said synthesizer;
accumulator means receiving output signals from said input means for generating successive signals corresponding to respective storage addresses of respective storage locations in said storage means;
said storage means being responsive at least to the output of said accumulator means for generating output signals corresponding to the digital values stored at the storage locations represented by the address signals coupled thereto from said accumulator means;
generating means at least responsive to an output of said accumulator means for generating at least a signal representing a quadrant of the output signal from said synthesizer at a particular point in time;
first complementing means responsive to the output of said accumulating means and to said quadrant signal for selectively complementing the output of said accumulating means as a function of said quadrant signal, the output of said first complementing means corresponding to predetermined storage locations in said storage means;
a digital-to-analog converter coupled to the output of said storage means for generating a step-type representation of the output signal from said synthesizer as a function of said samples represented by the output of said storage means; and
a low pass filter coupled to the output of said digital-to-analog converter and responsive to said step-type representation for generating a smoothed output signal having said predetermined frequency.

9. The frequency synthesizer of claim 8 further comprising a fixed frequency standard coupled to said accumulator means for causing said accumulator means to generate said successive signals.

10. The frequency synthesizer of claim 8 wherein said accumulator means is a module $10^N$ accumulator means.

11. The frequency synthesizer of claim 10 wherein said accumulator includes a modulo 1000 accumulator and wherein said first complementing means is a 999's complementor.

12. The frequency synthesizer of claim 8 wherein said generating means further generates a SGN signal representing the sign of the output signal at a particular point in time with reference to a given reference level, and including second complementing means receiving the outputs from said storage means for selectively complementing the outputs of said storage means as a function of said SGN signal, thereby generating the digital representation of sample values having positive or negative polarity with respect to a given reference level.

13. A digital frequency synthesizer comprising:
input means for setting a predetermined output frequency and for generating digital signals representing said predetermined output frequency;
storage means having a plurality of storage locations for storing a plurality of digital values corresponding to at least the magnitude of a plurality of digital samples of the output signal from said synthesizer;
accumulator means receiving output signals from said input means for generating successive signals corresponding to respective storage addresses of respective storage locations in said storage means;
said storage means being responsive at least to the output of said accumulator means for generating output signals corresponding to the digital values stored at the storage locations represented by the address signals coupled thereto from said accumulator means;
generating means at least responsive to an output of said accumulator means for generating a SGN signal representing the sign of the output signal at a particular point in time with reference to a given reference level;
second complementing means receiving the outputs from said storage means for selectively complementing the outputs of said storage means as a function of said SGN signal, thereby selectively generating the digital representation of sample values having positive and negative polarity with respect to a given reference level;
a digital-to-analog converter coupled at least to the output of said second complementing means for generating a step-type representation of the output signal from said synthesizer as a function of said samples represented at least by the output of said second complementing means; and
a low pass filter coupled to the output of said digital-to-analog converter and responsive to said step-type representation for generating a smoothed output signal having said predetermined frequency.

14. The frequency synthesizer of claim 13 further comprising a fixed frequency standard coupled to said accumulator means for causing said accumulator means to generate said successive signals.

15. The frequency synthesizer of claim 13 wherein said accumulator means is a modulo $10^N$ accumulator means.

16. The frequency synthesizer of claim 13 wherein said digital-to-analog converter is coupled to said generating means and is responsive to said SGN signal.

17. A digital frequency synthesizer comprising:
input means for setting a predetermined output frequency and for generating digital signals representing said predetermined output frequency;
storage means having a plurality of storage locations for storing a plurality of digital values corresponding to at least the magnitude of a plurality of least significant bits of said digital samples of the output signal from said synthesizer;
accumulator means receiving output signals from said input means for generating successive signals corresponding to respective storage addresses of respective storage locations in said storage means;
said storage means being responsive at least to the output of said accumulator means for generating output signals corresponding to the digital values stored at the storage locations represented by the address signals coupled thereto from said accumulator means;
logic means responsive to the output of said storage means and responsive to the address signals supplied to said storage means for generating the more significant bits of said samples which are not stored in said storage means;

a digital-to-analog converter coupled to the outputs of said storage means and said logic means for generating a step-type representation of the output signal from said synthesizer as a function of said samples; and a low pass filter coupled to the output of said digital-to-analog converter and responsive to said step-type representation for generating a smoothed output signal having said predetermined frequency.

18. The frequency synthesizer of claim 17 further comprising a fixed frequency standard coupled to said accumulator means for causing said accumulator means to generate said successive signals.

19. The frequency synthesizer of claim 17 wherein said accumulator means is a modulo $10^N$ accumulator means.

20. The frequency synthesizer of claim 17 wherein said logic means is responsive to the most significant bit of the output of said storage means and to a plurality of the most significant bits of the address signals fed to the storage means.

21. The frequency synthesizer of claim 17 including generating means at least responsive to an output of said accumulator means for generating at least a signal representing a quadrant of the output signal from said synthesizer at a particular point in time, and including first complementing means responsive to the output of said accumulator means and to said quadrant signal for selectively complementing the output of said accumulating means as a function of said quadrant signal, the output of said first complementing means corresponding to predetermined storage locations in said storage means.

22. The frequency synthesizer of claim 21 wherein said generating means further generates a SGN signal representing the sign of the output signal at a particular point in time with reference to a given reference level, and including second complementing means receiving the outputs from said storage means for selectively complementing the outputs of said storage means as a function of said SGN signal, thereby generating the digital representation of sample values having positive or negative polarity with respect to a given reference level.

23. The frequency synthesizer of claim 17 wherein said generating means further generates a SGN signal representing the sign of the output signal at a particular point in time with reference to a give reference level, and including second complementing means receiving the outputs from said storage means for selectively complementing the outputs of said storage means as a function of said SGN signal, thereby generating the digital representation of sample values having positive or negative polarity with respect to a given reference level.

24. A digital frequency synthesizer comprising:

input means for setting a predetermined output frequency and for generating digital signals representing said predetermined output frequency;

storage means having a plurality of storage locations for storing a plurality of digital values corresponding to at least the truncated magnitude of a plurality of digital samples of the output signal from said synthesizer;

accumulator means receiving output signals from said input means for generating successive signals corresponding to respective storage addresses of respective storage locations in said storage means;

said storage means being responsive at least to the output of said accumulator means for generating output signals corresponding to the digital values stored at the storage locations represented by the address signals coupled thereto from said accumulator means;

generating means for generating a SGN signal representing the sign of the output signal at a particular point in time with reference to a given reference level;

a 1's complementing means receiving the outputs from said storage means and responsive to said SGN signal to selectively complement the outputs of said storage means as a function of said SGN signal, thereby selectively generating the digital representation of sample values having positive and negative polarity with respect to a given reference level;

a digital-to-analog converter coupled at least to the output of said 1's complementing means for generating a step-type representation of the output signal from said synthesizer as a function of said samples represented by the output of said 1's complementing means; and a low pass filter coupled to the output of said digital-to-analog converter and responsive to said step-type representation for generating a smoothed output signal having said predetermined frequency.

25. The frequency synthesizer of claim 24 further comprising a fixed frequency standard coupled to said accumulator means for causing said accumulator means to generate said successive signals.

26. The frequency synthesizer of claim 24 wherein said accumulator means is a modulo $10^N$ accumulator means.

27. The frequency synthesizer of claim 24 wherein said generating means further includes means for generating at least a signal representing a quadrant of the output signal from said synthesizer at a particular point in time, and including first complementing means responsive to the output of said accumulating means and to said quadrant signal for selectively complementing the output of said accumulating means as a function of said quadrant signal, the output of said first complementing means corresponding to predetermined storage locations in said storage means.

28. The frequency synthesizer of claim 27 wherein said storage means stores a plurality of digital values corresponding to a plurality of least significant bits of said digital samples, and including logic means responsive to the output of said storage means and responsive to the address signals supplied to said storage means for generating the more significant bits of said samples which are not stored in said storage means.

29. The frequency synthesizer of claim 24 wherein said storage means stores a plurality of digital values corresponding to a plurality of least significant bits of said digital samples, and including logic means responsive to the output of said storage means and responsive to the address signals supplied to said storage means for generating the more significant bits of said samples which are not stored in said storage means.

30. A digital frequency synthesizer comprising:

input means for setting a predetermined output frequency and for generating digital signals representing said predetermined output frequency;

storage means having a plurality of storage locations for storing a plurality of digital values corresponding to at least the magnitude of a plurality of digital samples of the output signal from said synthesizer;

accumulator means receiving output signals from said input means for generating successive signals corresponding to respective storage addresses of respective storage locations in said storage means;

second generating means responsive to said accumulator means and to said input means for generating at least one more significant bit of the digital representation of the output frequency of the synthesizer, said at least one more significant bit being coupled to said storage means as an address signal in combination with the output from said accumulator means;

said storage means being responsive at least to the output of said accumulator means and of said second generating means for generating output signals corresponding to the digital values stored at the storage locations represented by the address signals coupled thereto;

a digital-to-analog converter coupled to the output of said storage means for generating a step-type representation of the output signal from said synthesizer as a function of said samples represented by the output of said storage means; and a low pass filter coupled to the output of said digital-to-analog converter and responsive to said step-type representation for generating a smoothed output signal having said predetermined frequency.

31. The frequency synthesizer of claim 30 further comprising a fixed frequency standard coupled to said accumulator means for causing said accumulator means to generate said successive signals.

32. The frequency synthesizer of claim 30 wherein said accumulator means is a modulo $10^N$ accumulator means.

33. The frequency synthesizer of claim 30 wherein said second generating means generates a signal representing the quadrant of the output signal from said synthesizer at a particular point in time, and a SGN signal representing the sign of the output signal at a particular point in time with reference to a give reference level.

34. The frequency synthesizer of claim 33 including first complementing means responsive to the signal representing a quadrant of the output signal and to the output of said accumulating means for selectively complementing the output of said accumulating means as a function of said quadrant signal, the output from said first complementing means being coupled to said storage means as address signals, and including second complementing means receiving the outputs from said storage means and for selectively complementing the outputs of said storage means as a function of said SGN signal, thereby selectively generating the digital representation of sample values having positive and negative polarity with respect to a given reference level.

35. The frequency synthesizer of claim 33 wherein said storage means stores a plurality of digital values corresponding to a plurality of least significant bits of said digital samples, and including logic means responsive to the output of said storage means and responsive to the address signals supplied to said storage means for generating the more significant bits of said samples which are not stored in said storage means.

36. A digital frequency synthesizer comprising:

input means for setting a predetermined output frequency and for generating digital signals representing said predetermined output frequency;

storage means having a plurality of storage locations for storing a plurality of digital values corresponding to at least the rounded-off magnitudes of a plurality of digital samples of the output signal from said synthesizer;

accumulator means receiving output signals from said input means for generating successive signals corresponding to respective storage addresses of respective storage locations in said storage means;

said storage means being responsive at least to the output of said accumulator means for generating output signals corresponding to the digital values stored at the storage locations represented by the address signals coupled thereto from said accumulator means;

generating means for generating a SGN signal representing the sign of the output signal at a particular point in time with reference to a given reference level;

a 2's complementing means receiving the outputs from said storage means and responsive to said SGN signal to selectively complement the outputs of said storage means as a function of said SGN signal, thereby selectively generating the digital representation of sample values having positive and negative polarity with respect to a given reference level;

a digital-to-analog converter coupled at least to the output of said 2's complementing means for generating a step-type representation of the output signal from said synthesizer as a function of said samples represented by the output said 2's complementing means; and a low pass filter coupled to the output of said digital-to-analog converter and responsive to said step-type representation for generating a smoothed output signal having said predetermined frequency.

37. The frequency synthesizer of claim 36 further comprising a fixed frequency standard coupled to said accumulator means for causing said accumulator means to generate said successive signals.

38. The frequency synthesizer of claim 36 wherein said accumulator means is a modulo $10^N$ accumulator means.

39. A digital frequency synthesizer for generating a sinusoidal output signal comprising:

input means for setting a predetermined output frequency and for generating digital signals representing said predetermined output frequency;

storage means having a plurality of storage locations for storing a plurality of digital values corresponding to at least the magnitude of a plurality of digital samples of the output signal from said synthesizer, said storage means storing at each location a predetermined number of bits which is less than the total number of bits required to represent said digital values corresponding to said samples;

means responsive to said input means for generating successive signals corresponding to respective storage addresses of respective storage locations in said storage means for causing said storage means to provide outputs corresponding to respective samples of the predetermined frequency sinusoidal output of said synthesizer;

logic means responsive to the most significant bit of the output of said storage means and to a plurality of the most significant bits of the address signals fed to said storage means for generating the most significant bits of the digital values corresponding to said samples of said output signal;

a digital-to-analog converter coupled to the output of said storage means and to the output of said logic means for generating a step-type representation of the output signal from said synthesizer as a function of said samples as represented by the output of said storage means and said logic means; and a low pass filter coupled to the output of said digital-to-analog converter and responsive to said step-type representation for generating a smoothed output sinusoidal signal having said predetermined frequency.

40. The frequency synthesizer of claim 39 further comprising a fixed frequency standard coupled to said accumulator means for causing said accumulator means to generate said successive signals.

* * * * *